United States Patent Office 2,890,405
Patented June 9, 1959

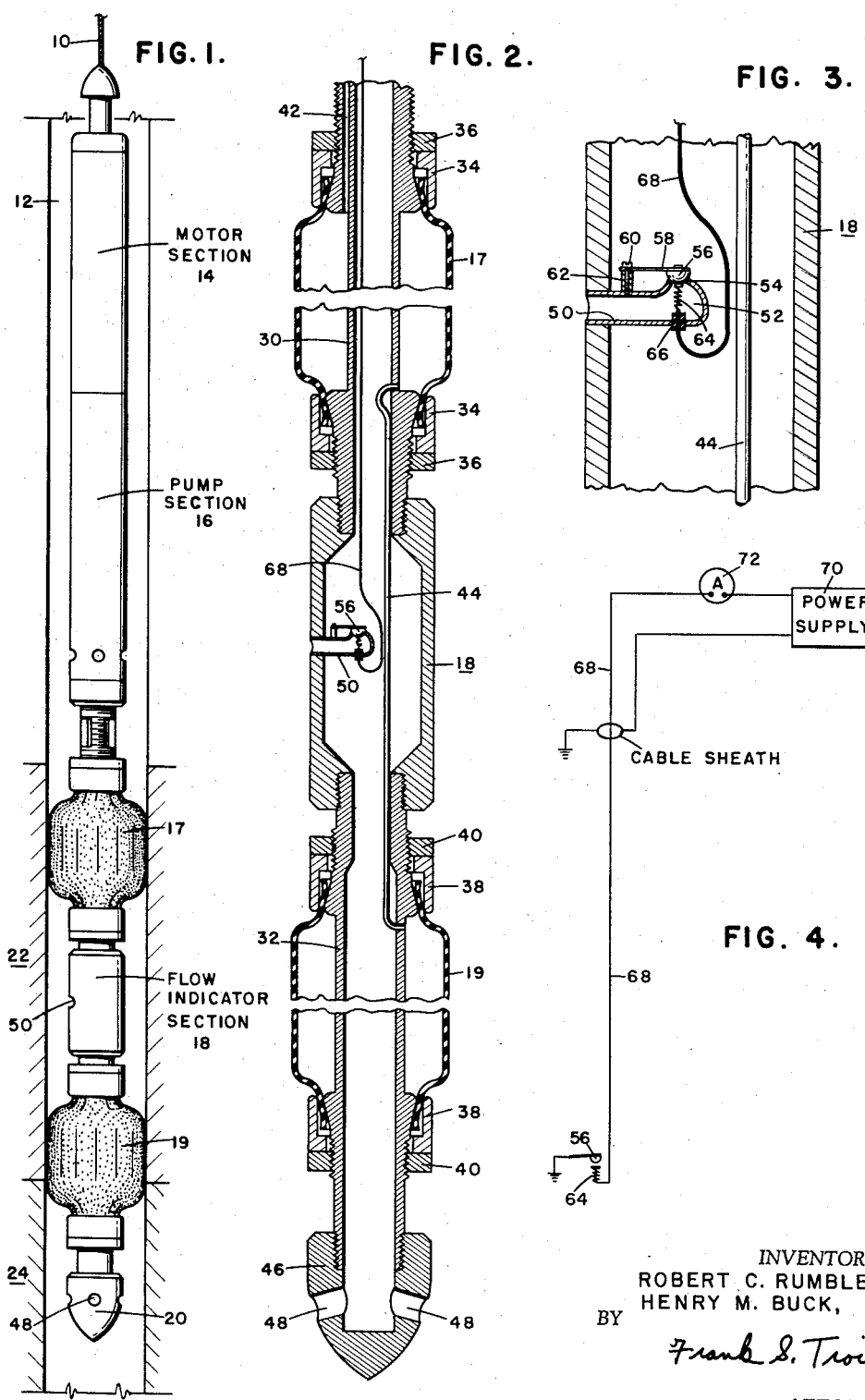

2,890,405

FLUID FLOW INDICATOR AND FLUID IDENTIFIER

Robert C. Rumble and Henry M. Buck, Houston, Tex., assignors, by mesne assignments, to Jersey Production Research Company, Tulsa, Okla., a corporation of Delaware Application June 19, 1957, Serial No. 666,704

11 Claims. (Cl. 324—2)

This invention relates to devices for indicating the flow of fluids and identifying the fluids. More particularly, this invention relates to an apparatus for flowing fluids from a plurality of localities and identifying the fluids from a particular locality.

For many purposes, fluids are flowed from different areas and accumulated in a remote area. It is often desirable to ascertain the type of fluid which you are getting from one particular area. For example, in obtaining various subsurface fluids, such as salt water and oil from boreholes, it is desirable to produce the fluids from all of the various permeable formations penetrated by the borehole. At the same time, it is desirable to obtain an indication of the fluids being received from each particular formation.

It is an object of this invention to provide the art with a new and improved device for indicating the flow of an unknown fluid and identifying the fluid.

It is a further object of this invention to provide a fluid flow indicator and fluid identifier which is particularly useful in boreholes for identifying the liquids flowing from a particular permeable formation, while at the same time permitting the flow of fluids from a plurality of permeable formations.

Briefly described, our new invention includes an elongated fluid conduit having longitudinally spaced-apart fluid passageways for admitting fluids into the conduit. A conductive valve is positioned to permit the inflow of fluids through one of the passageways, while preventing the outflow of fluids. The valve member forms a part of an electric circuit for indicating the flow of a fluid through the particular passageway and identifying said fluid. The valve member forms a short circuit path when no fluid is flowing, as it remains seated. When fluid is flowing, the valve member is raised from its seat, providing an impedance path formed by the valve seat, the flowing liquid, and the valve member. Means are provided in the electrical circuit for indicating the impedance whereby the fluids entering the passageway can be identified.

When our new fluid flow indicator and identifier is used for flowing fluids from a borehole and indicating the kind of fluids flowing from a specific formation in the borehole, a means for isolating the specific formation is included. The isolating means may take the form of a pair of longitudinally spaced-apart inflatable packers.

Referring to the drawings:

Fig. 1 is an elevational view showing our new device in a borehole;

Fig. 2 is a sectional view showing the construction of the packers, flow indicator section, and nose plug of Fig. 1;

Fig. 3 is a sectional view of the flow indicator section; and

Fig. 4 is an electrical circuit diagram useful in explaining the operation of our new device.

Referring more particularly to Fig. 1, an elongated member is shown lowered by means of a cable 10 into a borehole 12. The elongated member includes a motor section 14, pump section 16, packer 17, flow indicator section 18, packer 19, and nose plug 20. The motor section 14 includes a motor which operates a reciprocal piston within the pump section 16 for inflating and deflating the packers 17 and 19. A detailed explanation of the operation of the motor section and the pump section can be had by referring to the co-pending patent application by Henry M. Buck et al., Serial No. 602,047, filed August 3, 1956, entitled "Completion Subsurface Packer and Flowmeter."

Fig. 1 shows permeable formations 22 and 24 within the borehole 12. The instrument is shown with the packer 17 and 19 isolating the permeable formation 22. The instrument is devised so that fluid flow can be obtained from both formations 22 and 24 and the fluids flowing from formation 22 identified.

Referring to Fig. 2, the upper packer 17 is mounted upon a mandrel 30; and the lower packer 19 is mounted upon a mandrel 32. Upper packer 17 is securely mounted upon mandrel 30 by means of a pair of clamping rings 34 and threaded nuts 36. Lower packer 19 is securely connected to mandrel 32 by means of clamping means 38 and threaded nuts 40.

A longitudinally extending fluid passageway 42 is formed in mandrel 30 and extends to the pump section 16. A packer equalizer tube 44 innerconnects the interiors of packers 17 and 19. Hence, packer 17 and 19 are both inflated by means of fluids from the pump section 16 which are forced through passageway 42 and equalizing tube 44.

A nose plug 46 having a plurality of passageways 48 is threaded to the lower extremity of mandrel 32. The fluids, such as the fluids from formation 24 when the device is positioned as is shown in Fig. 1, are free to flow through passageway 48, mandrel 32, flow indicator section 18, and mandrel 30 up to the surface.

The fluids flowing from formation 22 (see Fig. 1), flow through the flow indicator section which is shown in sectional view in Fig. 3. The flow indicator section 18 has formed therein a passageway for flowing fluids from formation 22 into the elongated member and up to the surface. The passageway may consist of a tubular member 50 which extends substantially perpendicular from the side wall of the fluid indicator section to a point substantially along the longitudinal axis thereof. Tube 50 has at its extremity a bowl-shaped portion 52. The bowl-shaped portion has an opening 54 which is normally closed by means of an electricity conductive valve 56 spring biased against the opening 54 by a leaf spring 58. Leaf spring 58 is connected to the side of tube 50 by means of a conductive pin 60 extending through a bushing 62.

The opening 54 and the valve 56 are located so that fluids flowing from below the fluid flow indicator and fluids flowing downwardly through the indicator will not unseat the valve 56 from its opening 54. Fluids flowing through tube 50 will, however, unseat the valve 56.

An insulated spring contact 64 is mounted on tube 50 by an insulator 66 which is located directly below the valve 56. Spring contact 64 is connected by means of an insulated conductor 68 to a power supply. Valve 56 is grounded through the elongated member.

The arrangement of the fluid indicator and identifier is such that as conductive valve 56 becomes unseated in response to fluid flow through tube 50 and opening 54, the conductive valve 56 will lose contact with spring contact 64. Electrical current flowing through conductor 68 and spring contact 64 must flow across the impedance presented by the flowing fluids. The amount of impedance will depend upon the conductivity of the fluids. The change in impedance will in turn vary the current flow. The change in current flow is indicated by means of an ammeter or any other means for indicating current flow.

An electrical circuit diagram useful in explaining the operation of our new device is shown in Fig. 4. The sheath about cable 10 is grounded. Conductive valve 56 is also grounded. Power is supplied to conductor 68 by means of a power supply 70. When fluid flows through tube 50, the valve member 56 will become unseated and separate from spring contact 64. The short circuit through contact 64 and valve member 56 is then presented with a resistance depending upon the conductivity of the flowing fluids. For example, if the flowing fluid is oil, the ammeter 72 in the surface equipment will indicate an open circuit. If the fluid should be salt water, the ammeter will differentiate between the short circuit present when the valve 56 rests on the seat and the partial short present when salt water flows. A fluid composed of oil and water would be manifest by alternate open-circuit and low resistance measurements between the conductor 68 and ground.

It is to be understood that even though our new fluid indicator and identifier has been described for a particular use, the new device has applicability for other purposes where fluids are flowed from a plurality of spaced-apart areas and it is desired to identify the fluids flowing from one particular area.

What is claimed is:

1. An apparatus comprising an elongated fluid conduit having at least one fluid passageway in the side thereof at a first location and a second fluid passageway in the side thereof at a second location longitudinally spaced from the passageways at the first location, an electrical circuit including a conductive valve member mounted so as to permit the inflow of fluids through the second passageway while preventing the outflow of fluids through said passageway, the valve member providing a short circuit path when no fluid is flowing through the second passageway and the valve member and any inflowing fluid providing an impedance having a magnitude depending upon the conductivity of the fluid, and means in the electrical circuit for indicating said impedance whereby the fluids entering the conduit through the second passageway are identified.

2. An apparatus in accordance with claim 1 wherein the second passageway consists of a tube.

3. An apparatus in accordance with claim 2 wherein the tube extends inwardly from the side of the conduit to a point substantially along the axis thereof.

4. An apparatus in accordance with claim 3 wherein the tube has a bowl-shaped portion at the extremity thereof, the bowl-shaped portion having an opening disposed so that fluids flowing from the opening flow in the same direction as the fluids flowing in the conduit from the fluid passageways at the first location, and the conductive valve consists of a spring biased electrical contact mounted on the tube and adapted to close the opening when no fluid flows through the second passageway.

5. An apparatus comprising an elongated electricity conducting fluid conduit having at least one fluid passageway in the side thereof at a first location, an electricity conducting tube having a bowl-shaped extremity extending inwardly perpendicularly from a side of the conduit at a location longitudinally spaced from the other fluid passageway, a conductive valve mounted on the tube and spring biased to close the opening in the bowl-shaped extremity when no fluid flows through the tube from outside the conduit, an electrical contact mounted within the bowl-shaped extremity in contact with the valve to provide a short circuit when no fluid flows through the tube, the valve member being adapted to be moved from the bowl-shaped opening and electrical contact by fluids flowing through the tube from outside the conduit whereby the impedance across the valve and electrical contact is varied in accordance with the conductivity of the fluids, and means for indicating said impedance.

6. An apparatus for indicating the kind of fluids flowing from a specific area in a borehole comprising an elongated member adapted to be lowered into the borehole having a fluid conduit formed therein and a fluid inlet, means for isolating said specific area, an electrical circuit including a conductive valve member mounted so as to permit the inflow of fluids through the fluid inlet while preventing the outflow of fluids through said inlet, the valve member providing a short circuit path when no fluid is flowing through the inlet and the valve member and any inflowing fluid providing an impedance having a magnitude depending upon the conductivity of the fluid, and means in the electrical circuit for indicating said impedance whereby the fluids entering the conduit through the inlet are identified.

7. An apparatus in accordance with claim 6 wherein the fluid inlet consist of a tube.

8. An apparatus in accordance with claim 7 wherein the isolating means comprises a pair of spaced-apart inflatable packers, one on each side of the fluid inlet.

9. An apparatus in accordance with claim 8 wherein the tube extends inwardly from the side of the conduit to a point substantially along the axis thereof.

10. An apparatus in accordance with claim 9 wherein the tube has a bowl-shaped portion at the extremity thereof, and the conductive valve consists of a spring biased electrical contact mounted on the tube and adapted to close the opening when no fluid flows through the inlet.

11. An apparatus for indicating the kind of fluids flowing from a specific area in a borehole comprising an elongated member adapted to be lowered into the borehole and having at least one fluid passageway in the side thereof at a first location, an electricity conducting tube having a bowl-shaped extremity extending inwardly perpendicularly from a side of the conduit at a location longitudinally spaced from the other fluid passageway, an inflatable packer mounted on the elongated member on each side of the conducting tube with one packer being mounted between the fluid passageway and the conducting tube, a conductive valve mounted on the tube and spring biased to close the opening in the bowl-shaped extremity when no fluid flows through the tube from outside the conduit, an electrical contact mounted within the bowl-shaped extremity in contact with the valve to provide a short circuit when no fluid flows through the tube, the valve member being adapted to be moved from the bowl-shaped opening and electrical contact by fluids flowing through the tube from outside the conduit whereby the impedance across the valve and electrical contact is varied in accordance with the conductivity of the fluids, and means for indicating said impedance.

References Cited in the file of this patent

UNITED STATES PATENTS

| 2,218,155 | Rusler | Oct. 15, 1940 |
| 2,377,501 | Kinley | June 5, 1945 |
| 2,688,872 | Hartline | Sept. 14, 1954 |